Figure 4:
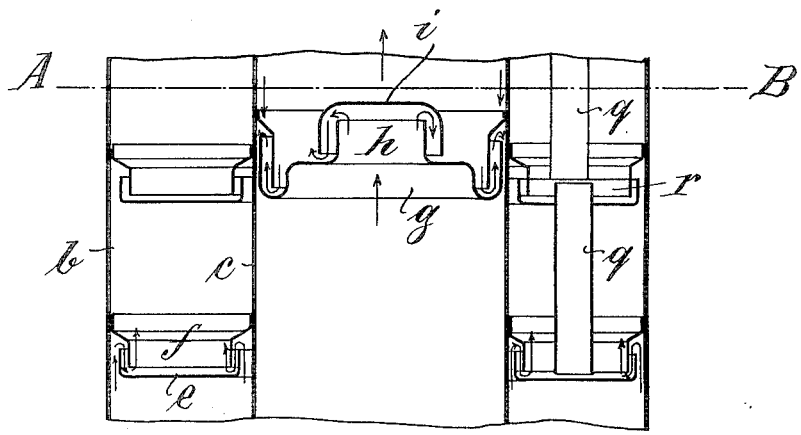

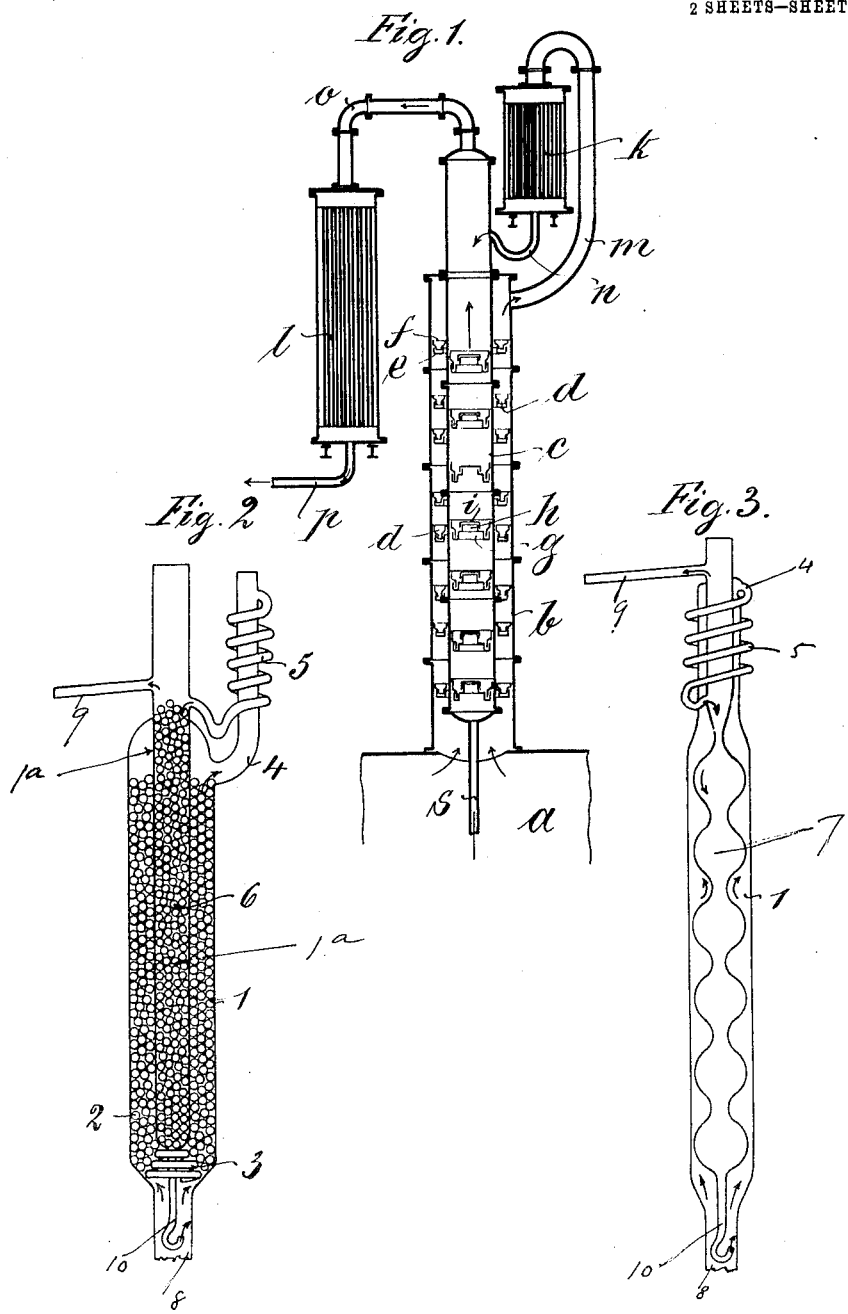

A. GOLODETZ.
RECTIFYING APPARATUS.
APPLICATION FILED AUG. 16, 1912.

1,086,452.

Patented Feb. 10, 1914.
2 SHEETS—SHEET 2.

Witnesses:
Charles B Brompton
Fred Pohl

Inventor
Abram Golodetz
by
Croydon Marsho
Attorney

UNITED STATES PATENT OFFICE.

ABRAM GOLODETZ, OF BERLIN, GERMANY, ASSIGNOR OF ONE-HALF TO BERNHARD BENEDIX, OF HAMBURG, GERMANY.

RECTIFYING APPARATUS.

1,086,452.  Specification of Letters Patent.  Patented Feb. 10, 1914.

Application filed August 16, 1912. Serial No. 715,490.

*To all whom it may concern:*

Be it known that I, ABRAM GOLODETZ, a subject of the Emperor of Russia, residing at 132 Linienstrasse, Berlin, in the German Empire, have invented certain new and useful Improvements in Rectifying Apparatus, of which the following is a specification.

This invention relates to continuous rectifying or distilling apparatus of the class in which a number of concentric cylindrical or substantially cylindrical columns are provided forming an inner cylindrical or substantially cylindrical chamber and one or more outer annular chambers, the vapors of the liquid to be distilled passing through said chambers successively and being rectified on their way therethrough.

The object of the present invention is to simplify the construction of such apparatus and to enable a much purer distillate to be obtained.

According to the present invention a cylindrical column is mounted upon the still or otherwise adapted to receive the vapors of the liquid to be distilled, the vapors entering said column from below. Concentrically arranged within said column is another similar column, the inner column as well as the annular space between the two columns, being, if necessary, provided with the usual rectifying devices. The upper end of the annular space between the columns connects with a condenser and the condensate therefrom passes into the upper end of the inner column and in falling down therethrough not only serves to dephlegmate or condense the vapors in the outer annular chamber by taking heat therefrom, but is also distilled therein by taking up the heat necessary for its vaporization from the vapors in the outer annular chamber, while the unvaporized constituents in the inner column are returned to the still for re-distillation.

It will thus be seen that the vapors undergo a process of rectification and dephlegmation in the outer annular chamber, are thereupon condensed in the condenser and again distilled and rectified in the inner column, the process going on continuously while no special source of heat is required to distil the liquid in the inner column, the liquid taking its heat from the vapors in the outer annular chamber.

It will, of course, be understood that the aforesaid arrangement is capable of variation without departing from the essence of the present invention, which consists in heating the liquid and vapors in the space inclosed by each inner column by the vapors in the next outer concentric space, and in arranging a condenser in the path of the vapors from each space to the next inner one.

In the accompanying drawings several forms of my improved rectifying or distilling apparatus are shown by way of example.

Figure 5:
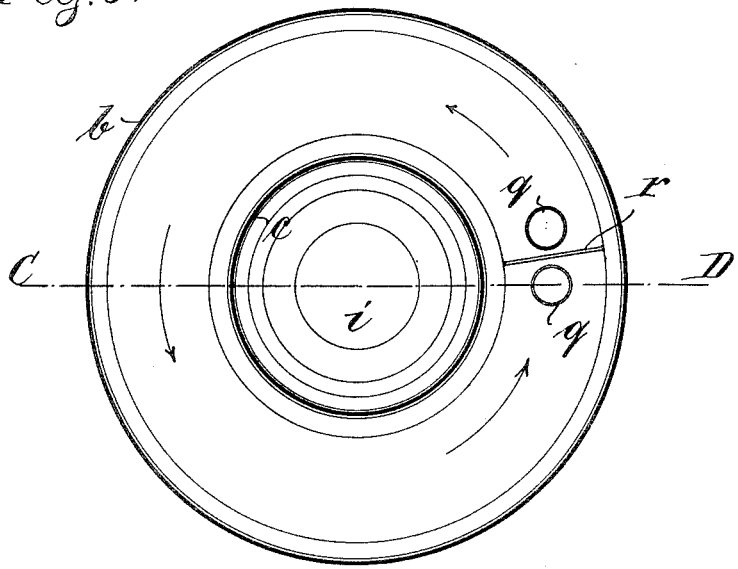

Figure 1 is a sectional view of an apparatus constructed according to the invention of metal for manufacturing purposes, certain parts being omitted. Figs. 2 and 3 illustrate two different modifications of the apparatus illustrated in Fig. 1, which may be constructed of glass for laboratory purposes. Figs. 4 and 5 are detail enlarged views of the rectifying apparatus shown in Fig. 1, showing a portion of the two columns with their trays, Fig. 4 being a vertical section on the line C—D of Fig. 5, and Fig. 5 being a transverse section on the line A—B of Fig. 4.

Referring firstly to Figs. 1, 4 and 5: *a* designates a still (shown broken away), in which the mixture of liquids to be distilled is heated by any suitable means. To this still *a* is connected the outer column *b*, which is preferably cylindrical. Within this column *b* is arranged a narrower column *c*, so that an annular space is provided between the walls of the outer column *b* and the inner column *c*. This annular space is fitted with suitable trays *d* such as are usually employed for rectifying purposes. As shown, these trays *d* may consist of annular pans *e* and rings *f* fitting into the pans *e*. The inner column c is provided with similar trays g, the central opening h of the trays g being, however, covered by a hood i.

The inner column c extends for the greater part of its length into the outer column b, and a condenser k is connected to the interior of the two columns b and c by pipes m and n respectively, as shown in Fig. 1. In the form shown in Fig. 1, another condenser l is connected with the upper portion of the inner column c by a pipe o.

The vapor generated in the still a passes into the annular space between the columns b and c from below and traverses the different trays d provided therein. From the upper portion of the outer column b the vapor is conducted through the pipe m to the condenser k which is cooled by a water current or by cold air, or by the liquid itself to be distilled. The vapor condensed in the condenser k is conveyed continuously by the pipe n into the inner column c and flows downwardly therethrough and is heated by the heat of the vapor in the outer column d. By heating the condensate as it flows downwardly through the inner column, a further distillation takes place thus yielding still richer vapors of the more volatile constituents. These vapors rise upwardly through the trays g of the inner column c and are constantly washed by the downwardly trickling product of condensation. They thus become rectified and are conducted by the pipe o to the second condenser l where they are condensed and may be conducted away by the pipe p. The less volatile liquid remaining in the trays or pans of the outer column may be either conducted by means of pipes q, which are arranged alternately on opposite sides of a partition r intermediate the rings f, to the liquid contained in the still a, or may be separately collected. The unvaporized constituents in the inner column c pass over the outer edges of the trays g and are returned through the pipe s to the still a.

Referring now to Fig. 2 which illustrates an apparatus which may be constructed of glass for smaller laboratory distillation: The vapors from the retort (not shown) enter from below at 8 into an annular chamber formed between two concentric glass tubes 1 and 1ª and filled with suitable material 2, as for instance, glass beads, pieces of wire or the like, the material being held in position by a spirally-wound glass rod 3. The vapors pass from this annular chamber through a side tube 4 into a worm condenser 5 where they are condensed by the external air and pass into the inner tube 1ª which is likewise filled with glass beads 6 or the like. A second distillation takes place in the tube 1ª, the heat being derived from the vapors in the annular chamber between the tubes 1 and 1ª and the vapors now formed pass away through an upper branch tube 9 while the unvaporized constituents in the tube 1ª are returned to the retort through a discharge tube 10.

In the modification according to Fig. 3 the rectifying process is similar to that described with reference to Figs. 1 and 2. In the outer tube 1 dephlegmation is attained by providing the inner tube 7 with constrictions so as to form a series of approximately spherical chambers, so that the annular space is constricted at intervals. This construction enables the use of a filling to be dispensed with and thus enables the apparatus to be used where small quantities of liquid are to be distilled or where the liquids to be distilled are valuable.

In both the constructions shown in Figs. 2 and 3 the outer and inner tubes instead of being simply fused together, may be joined at their upper ends by a cork. The worm condenser can, in this case, be made separate. For liquids of low boiling point the condenser may be provided with a water-cooling jacket.

I claim:—

1. In rectifying apparatus, an outer column open below to receive the vapors to be rectified, an inner column forming a space between it and the outer column, and a condenser connected to the upper end of said outer column and to the upper end of said inner column whereby the condensate from said condenser falls down through said inner column and is distilled therein by taking heat from the vapors in the space between said columns.

2. In rectifying apparatus, an outer column open below to receive the vapors to be rectified, an inner column forming a space between it and the outer column, a condenser connected to the upper end of said outer column and to the upper end of said inner column whereby the condensate from said condenser falls down through said inner column and is distilled therein by taking heat from the vapors in the space between said columns, and a discharge pipe connected to the lower end of said inner column for discharging unvaporized constituents therein.

3. In rectifying apparatus, an outer column open below to receive the vapors to be rectified, an inner column forming a space between it and the outer column, an air-cooled worm condenser connected to the upper end of said outer column and to the upper end of said inner column whereby the condensate from said condenser falls down through said inner column and is distilled therein by taking heat from the vapors in the space between said columns.

4. In rectifying apparatus, an outer column open below to receive the vapors to be rectified, an inner column constricted at intervals and forming a space between it and the outer column, and a condenser connected to the upper end of said outer column and to the upper end of said inner column whereby the condensate from said condenser falls down through said inner column and is distilled therein by taking heat from the vapors in the space between said columns.

In testimony whereof I affix my signature in presence of two witnesses.

ABRAM GOLODETZ.

Witnesses:
 HENRY HASPER,
 ARTHUR SCHROEDER.